May 27, 1952  S. S. CROSS ET AL  2,597,854
AUTOMATIC TRANSMISSION
Filed Jan. 28, 1950  2 SHEETS—SHEET 2

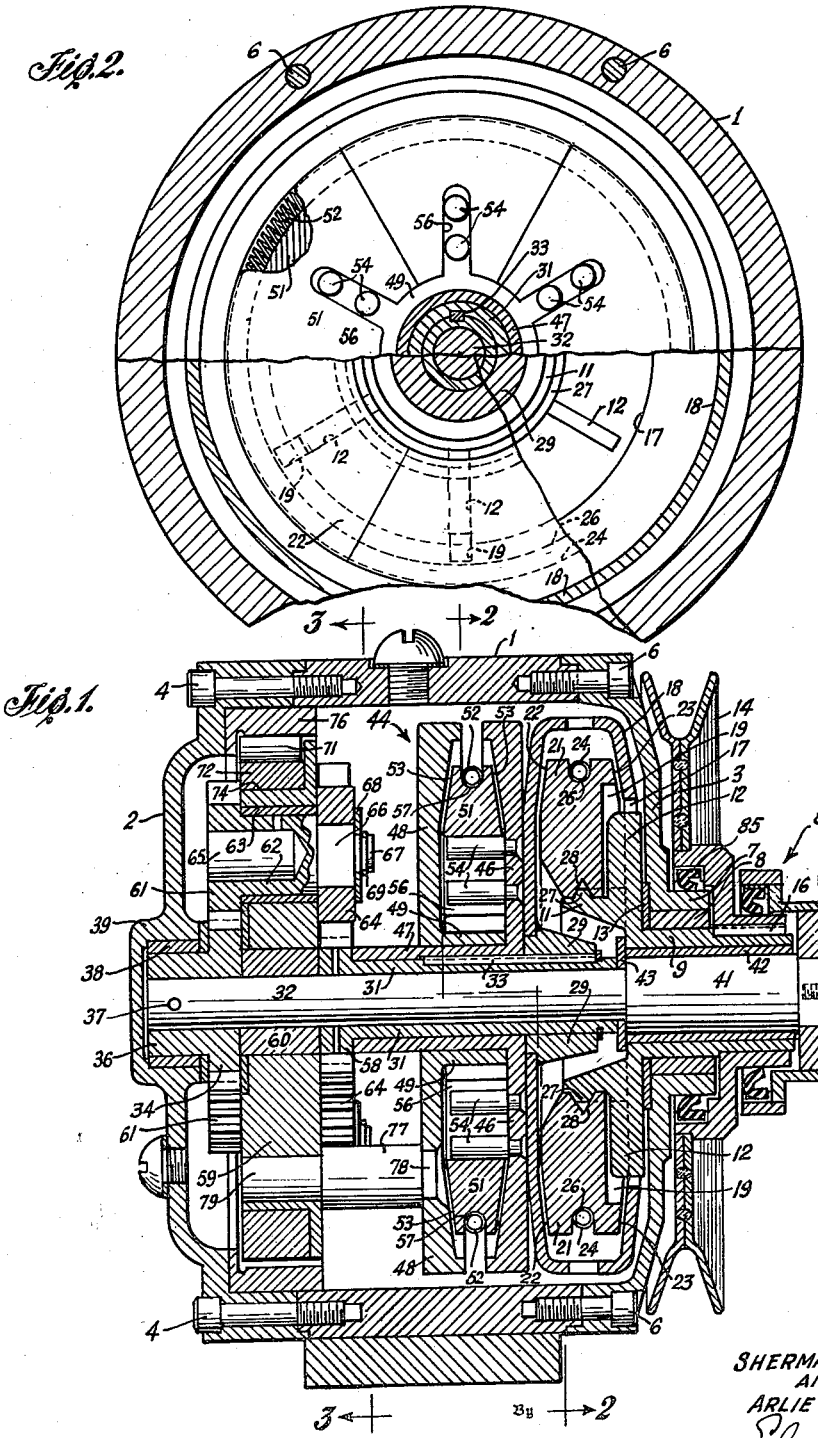

Inventors
SHERMAN S. CROSS
AND
ARLIE A. CROSS
Ely & Frye
Attorneys

Patented May 27, 1952

2,597,854

UNITED STATES PATENT OFFICE 2,597,854

AUTOMATIC TRANSMISSION

Sherman S. Cross, Cuyahoga Falls, and
Arlie A. Cross, Stow, Ohio

Application January 28, 1950, Serial No. 141,020

17 Claims. (Cl. 74—752)

This invention relates to an automatic transmission and, in particular, to a transmission in which torque-modifying arrangements are automatically cut in or cut out of the system by speed-responsive devices.

In the presently popular, light vehicles, such as motor bikes, "scooters," and the like, conventional gear shift systems are cumbersome and expensive, and the demand is for a light, compact, self-acting torque modifier which can be easily installed and easily removed for maintenance or replacement.

It is, therefore, an object of the invention to provide a torque-modifying transmission unit which is automatically responsive to speed to vary the torque. A further object is to provide a device of this nature which is simple of structure, light in weight, compact, and economical of manufacture.

These and other ends, which will be apparent to those skilled in the art, are attained by the invention, preferred forms of which are described in the following specification and illustrated in the drawings, in which:

Fig. 1 is an axial sectional view of one embodiment of the transmission unit,

Fig. 2 is a sectional view taken along the staggered line 2—2 of Fig. 1,

Figure 4:
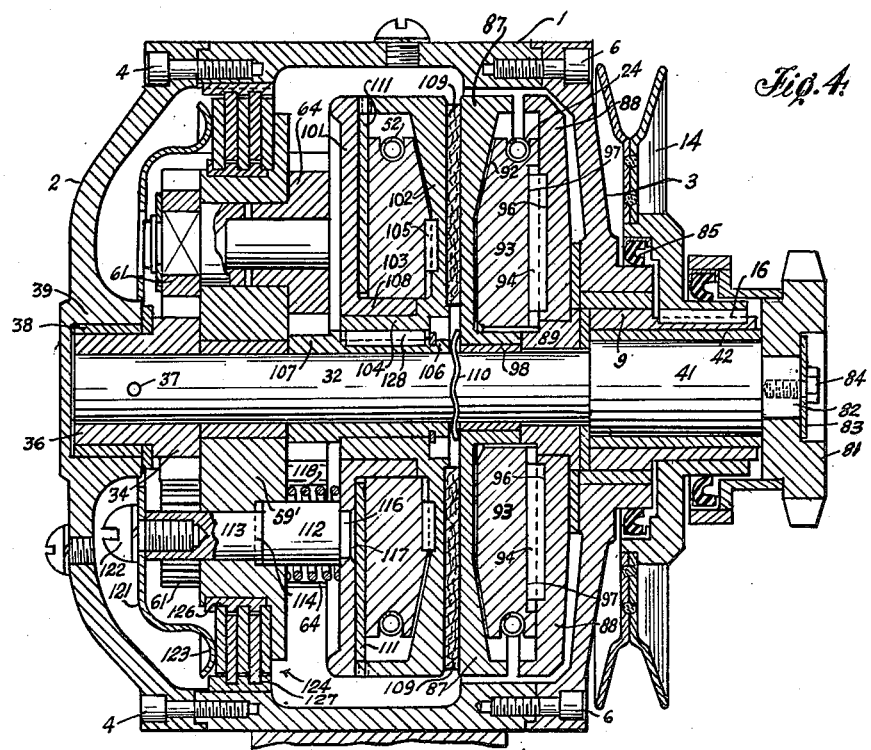
Fig. 4 is an axial sectional view of a modified embodiment of the transmission unit.
Figure 3:
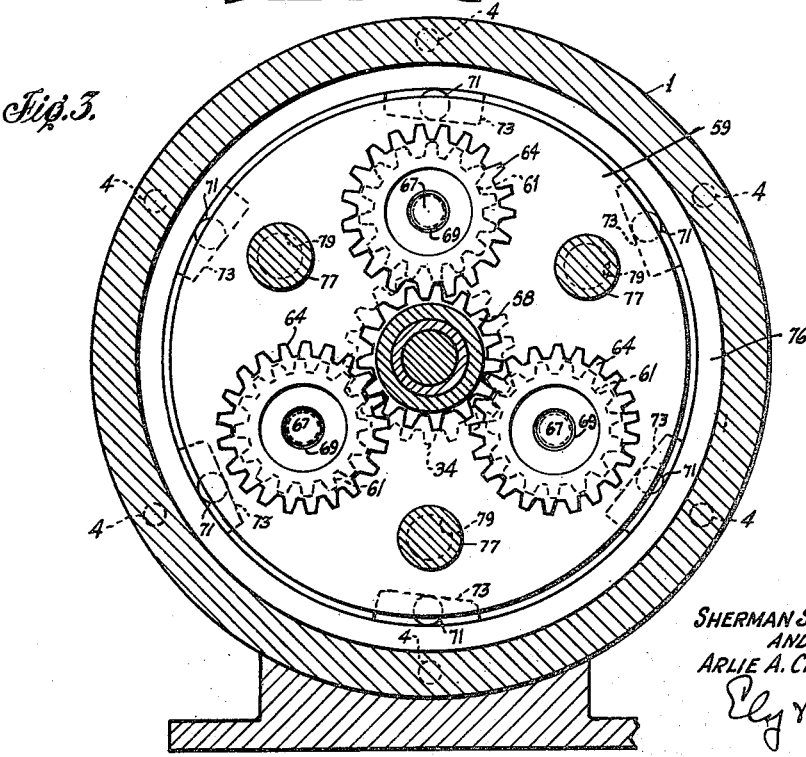
Fig. 3 is a sectional view taken on the line 3—3 of Fig. 1.

Referring to the drawings by characters of reference, there is shown, in Fig. 1, a ring-shaped housing 1, having end closure plates 2 and 3 secured by screws 4 and 6. End plate 3 has a central flange 7 defining a circular opening in which is fitted a bearing sleeve 8. A sleeve 9, fitted in bearing sleeve 8 for rotation therein, has a star wheel portion inwardly of plate 3, comprising a hub 11 and radial spokes 12. A thrust bearing disk 13 is provided between hub 11 and plate 3. A pulley 14, keyed to sleeve 9, at 16, serves as the power input when connected to the motor by a belt (not shown).

Spokes 12, six in number in the case shown, extend through an opening 17 of a cage 18 and are received in radial slots 19 of six sector-shaped centrifugal weight elements 21 so as to carry them in rotation with input pulley 14. Weights 21 have an outwardly reducing taper on their opposite sides, as at 22, 23, and the walls of cage 18 are similarly tapered in their outer extent so as to provide a jamming action between the weights and the cage, as the former move outwardly.

Weights 21 are normally held in their radially inner positions, away from wedging contact with cage 18, by means of a helical, "garter" spring 24, received in grooves 26 in the outer faces of the weights. The latter will have characteristics appropriate to the input speed at which it is desired to connect the low gearing, which, as will be shown, occurs when cage 18 is picked up by weights 21. Hub 11 has an annular rib 27 adapted to receive V-grooves 28 in the inner edges of weights 21 to maintain them centrally of the walls of cage 18 when in their inner position.

Cage 18 has an internal hub 29 secured as by welding in an opening in the cage wall opposite the wall having opening 17. Hub 29 is mounted on a sleeve 31 rotatably mounted on an output shaft 32, hub 29 being secured to sleeve 31 by a key 33.

Output shaft 32 is the central element of the system and carries, at one end, a gear 34 having a hub 36 secured to the shaft by a pin 37 and rotatable in a bearing sleeve 38 secured in an internal, blind bore of a central boss 39 on housing plate 2. At its other end, shaft 32 has an enlarged section 41 rotatably mounted in a bearing sleeve 42 carried in sleeve 9. A thrust bearing washer 43 is located at the shoulder defined by enlarged portion 41 of the shaft and abuts the ends of sleeves 9 and 31.

A second weight cage, indicated generally by the numeral 44, has a circular wall element 46 with a central hub 47, which is carried in rotation with sleeve 31 by the same key 33 which carries hub 29 of cage 18. Thus, cage 18 and cage element 46 rotate in unison. The opposite wall element 48 of cage 44 has an inwardly extending hub 49 which rotates on hub 47 of element 46.

Six sector-shaped weights 51, contained between cage elements 46, 48 are free to slide outwardly, against the pressure of a surrounding, helical "garter" spring 52, and have tapering sides 53 adapted to engage correspondingly tapered inner walls of cage elements 46, 48 so that element 48 will be carried in rotation by element 46. Rotation is imparted to weights 51 by pins 54 carried by cage element 46 and engaging in radial slots 56 in the weights. Spring 52 is accommodated in circumferential grooves 57 in the weights.

Formed on the end of, or otherwise secured to the end of sleeve 31, is a gear 58 and, adjacent thereto, is a large wheel 59 having a central bearing sleeve 60 mounted for rotation on output shaft 32. Wheel 59 serves to carry reduction gearing which transmits the drive from gear 58 to gear 34 on output shaft 32. For this purpose, a series of three pairs of gears are rotatably mounted medially of the radial extent of wheel 59. Each pair comprises an outer gear 61 having a shaft 62 rotatable in a bearing sleeve 63 carried in a bore in wheel 59, and an inner gear 64 mounted on a square extension 66 of shaft 62 so as to rotate therewith, gear 64 being secured to a reduced portion 67 of extension 66 by a washer 68 and a spring ring 69 engaged in an annular groove of portion 67.

Gears 64 are bored as at 65, so that oil penetrates the interior thereof and leads to the journal surface. It has been found that with such arrangement, the gears are cooler when running than in the case where oil is applied only to the outer surfaces of the gears.

Gear 58 engages gears 64 and gears 61 engage gear 34. From the relative diameters of the gears, it will be seen that, assuming wheel 59 held against rotation, shaft 62 will have a lower angular velocity than sleeve 31 and shaft 32 will have a lower angular velocity than shaft 62. Thus, there is a two-stage reduction and the total reduction may be varied by appropriate selection of the several gears.

For the purpose of bringing the foregoing-described reduction gearing into play, wheel 59 is held against rotation in one direction by an over-running clutch mechanism. Conveniently, this will comprise a conventional system of rollers 71 engaging between inclined slots in the periphery of wheel 59 and an inner wall of a fixed part of the housing. The elements contacted by the rollers will preferably be hardened and, for this purpose, an annular, hardened insert 72, having inclined slots 73, is seated on an annular shoulder 74 of wheel 59, and a hardened, annular ring 76 is secured to the housing.

It should be noted that although the gear system 58, 64 appears to be of planetary construction, the action is not, in fact, planetary since the wheel 59 does not rotate when gears 64 rotate.

Direct drive, or high gear, is accomplished by a direct connection between cage element 48 and wheel 59. This is accomplished by three pins 77, each having a reduced shank 78 engaged in a bore in cage 48 and a reduced shank 79 engaged in a bore in wheel 59.

Power take-off may be had by means of a sprocket 81, secured on a square extension 82 of shaft 32 by a washer 83 and cap screw 84 threaded in the end of extension 82, or a pulley may be employed, or both.

A sleeve 80 secured on the sprocket 81 extends over the hub of pulley 14, and accommodates an oil-sealing ring 85. Obviously, the power take-off may be accomplished at either end of shaft 32.

Operation of the Fig. 1 device: As pulley 14 is driven by the pulley from the motor, spokes 12 are likewise rotated, carrying with them weights 21. When the speed of rotation is sufficient for weights 21 to move outward and grip cage 18 against the restraining force of spring 24, cage 18 is likewise carried in rotation, as are sleeve 31 and cage element 46, through key 33. Gear 58 also rotates, since it is a part of sleeve 31. Due to the resistance of the load at the output sprocket wheel 81, the action of reduction gears 58, 64, 61, and 34 tends to rotate wheel 59 in a direction reverse to the rotation of input pulley 14. Such reverse rotation is solidly resisted by the rollers 71 of the over-running clutch jamming in their grooves and, therefore, the action flows through the reduction gears 58, 64, 61, 34 to turn shaft 32 at low speed.

As the input speed is increased, weights 51 overcome spring 52 and move outwardly to pick up cage element 48, and the rotation of the latter is imparted to wheel 59 through pins 77. Wheel 59 and gear 58 are then rotating at the same angular velocity, relative rotation of the reduction gearing is impossible, and the entire system between input pulley 14 and output sprocket 81 rotates as a unit. This is high speed.

Obviously, the system may be compounded along similar lines to provide a greater number of ranges of speed.

In Fig. 4 is shown a modification with an alternative form of device for preventing retrograde rotation of the wheel carrying the reduction gearing and there is also shown an improved manner of communicating rotation to the respective centrifugal weight cages. Parts similar to those of Fig. 1 are indicated by the same reference numerals.

The low speed weight cage is comprised of two disks 87, 88, the latter being secured to a hub 89 of an input sleeve 91. Disk 87 has a slanted wall portion 92, whereas the inner wall of disk 88 is generally planar. The weights 93 have an outer form complementary to these walls. Keys 94 lodged in slots 96 of disks 88 extend into slots 97 of weights 93 so as to carry the weights in rotation but permit them to move outwardly. Cage 87—88 has a bearing sleeve 98 rotatable on output shaft 32.

The high speed weight cage also has a flat wall disk 101 and a slant wall disk 102 and complementary weights 103 driven by disk 102 through keys 105. A hub 104 of disk 102 is keyed, as at 128, to the hub 106 of a gear 107, rotatable on shaft 32 and corresponding, respectively, to sleeve 31 and gear 58 of Fig. 1. Disk 101 has a hub 108 rotatable on hub 104.

An annular friction plate 109, of asbestos or like material having heat-resistant and frictional properties located between disk 87 and disk 102 serves to transmit rotation therebetween when disk 87 is picked up by weights 93, disk 87 being normally retained out of pressure contact with plates 109 and in abutting relation with hub 89, by means of a corrugated, spring washer 110 abutting sleeve 106. Similarly, a friction plate 111 transmits rotation to disk 101 when weights 103 contact the slant wall part of disk 102. This arrangement gives a large area of frictional contact, and is superior to that in which the driving friction is limited to surfaces of the slant sides of the centrifugal weights.

The reduction gearing is similar to that shown in Fig. 1, wheel 59' corresponding to wheel 59.

It will be seen that as disk 101 is picked up by plates 111, in the outward movement of weights 103, it is moved outwardly and this motion is utilized to operate the mechanism for releasing wheel 59' for rotation at high speed.

Disk 101 is connected to wheel 59' by three pins 112 having reduced ends 113 slidable in bores in wheel 59' and the pins being slidable in a counterbore 114. On their other ends, pins 112 have reduced shanks 116 engaged in bores in disk 101 and secured by heads 117. A spring 118 surrounds pin 112 and reacts against wheel 59' to force sleeve 108 of disk 101 against a shoulder 119 of disk 102. Thus pin 112 is normally urged inwardly, carrying with it a dished member 121 which is secured by screws 122 to reduced ends 113 of the pins. The arcuately flanged, marginal portion 123 of member 121 is thus urged against the outer one of a series of friction plates 124, alternate plates of which are keyed as at 126 to wheel 59' and as at 127 to the housing 1.

Operation of the Fig. 4 modification: Pulley 14 carries with it disk 88 and, when the speed is sufficient, weights 93 pick up disk 87 and also disk 102, through plates 109. Key 105 causes sleeve 106 and gear 107 to turn. Since disk 101 is urged to its innermost position by spring 118, flanges 123 of member 121 are pressing against friction plates 124; wheel 59' is therefore held against rotation and the reduction gearing 64, 61, 34 comes into play as in the case of Fig. 1.

When the speed is sufficient for weights 103 to pick up disk 101, the latter moves outwardly carrying member 121 with it to relieve the pressure on plates 124, and pins 112 carry wheel 59' in rotation, with the whole system rotating as a unit, as in the case of Fig. 1.

Obviously, the form and arrangement of the weight cages of Fig. 4 may be substituted for those of Fig. 1. Likewise, the pressure plates 124 and associated elements may be substituted for the over-running clutch of Fig. 1.

It is to be particularly noted that in using pressure plates such as 124 or equivalent, instead of an over-running clutch, the transmission, as a whole, is operable in either direction of rotation.

Whereas certain embodiments of the invention have been shown and described, the invention is not limited thereby since changes in the size, shape, and arrangement, for instance of the various parts may be made without, however, departing from the spirit or scope of the appended claims.

What is claimed is:

1. A power transmission comprising a first series of centrifugal weights, means enclosing said first series and adapted to be rotated thereby, a gear connected to said means for rotation therewith, a wheel having a planetary gear meshing with the first-mentioned gear, a second planetary gear, an output shaft, a gear on said output shaft meshing with said second planetary gear, said gears being of a size to constitute a reduction in rotational speed between said first-mentioned means and said output shaft, means to prevent rotation of said wheel in one direction, a second series of centrifugal weights, means enclosing said second series and comprising separately rotatable sections, one of said sections carrying said second series of weights and having a connection with the first mentioned means to be rotated thereby, the other of said sections adapted for rotation by said second series of weights, and the said other of said sections and said wheel being connected so as to rotate in unison.

2. A device as in claim 1, said means to prevent rotation comprising an over-running clutch.

3. A device as in claim 1, said means to prevent rotation comprising a friction means having an operating spring connected to said other of said sections and said spring movable with the latter into and out of engagement with said friction means.

4. In a device as in claim 1, a housing journaling said output shaft at opposite ends and the elements of the transmission being supported on and rotatable about said output shaft.

5. A device as in claim 1, said first-mentioned means being a unitary structure and keyed for common rotation with said one of said sections.

6. A device as in claim 1, said first-mentioned means comprising a normally freely rotatable element, engageable by said first series of weights, and said connection comprising friction plates between the freely rotatable element and said one of said sections.

7. A device as in claim 1, said weights of one series having a slant surface on one side only and the enclosing means of said series having a wall slanted to complement the slant surface of said weights.

8. A device as in claim 1, said connection comprising friction plates, and said first-mentioned means comprising a wedge element engageable by the weights of said first series and movable axially thereby to press on said friction plates.

9. A power transmission comprising a housing, an output shaft journaled in opposite walls of said housing and extending therefrom, an input sleeve rotatable on said shaft, a first cage rotatable on said shaft, spring-pressed weights in said cage adapted to move radially outwardly to grip the first cage and rotate it, driving means between said input sleeve and said weights to revolve the weights about the shaft, a wheel rotatable on said shaft, a first gear on one side of said wheel, rotatable on the shaft and connected to said first cage for rotation therewith, a second gear on the other side of said wheel and keyed to said shaft, a pair of coaxially arranged gears carried by said wheel and engaging the said first and second gears, respectively, means to prevent rotation of said wheel in one direction, a second cage rotatable about said shaft and having an element with a driving connection from said first cage and centrifugal weights keyed to said element and slidable radially thereof, said second cage having a further element rotatable about said shaft and engageable by the weights in said second cage to be rotated thereby, and means connecting said second element and said wheel whereby the wheel is rotated by the said second element.

10. A device as in claim 9, said first cage having an axial opening, and said driving means comprising an element of said input sleeve extending within said opening and having keying means engaging the weights in the said first cage in a manner to permit radial movement of the weights.

11. A device as in claim 9, said first cage having independently rotatable parts, one of which is connected to said input sleeve, and keying means between said one of said parts and the weights in said first cage arranged to revolve the weights about the said shaft but permit movement of the weights radially of the shaft.

12. A device as in claim 9, the connection between said first gear and said first cage comprising a hub on the said first gear on which both said cages are mounted, and keying means between said first cage and said hub.

13. A device as in claim 12, the first-mentioned element of said second cage being also keyed to said hub.

14. A device as in claim 9, the connection between said first gear and said first cage comprising a hub on said first gear, on which said second cage is mounted, the first-mentioned element of said second cage being keyed to said hub.

15. A device as in claim 9, said first cage comprising an element adapted to be rotated by the weights in said first cage, frictional driving means between said element and the first-mentioned element of said second cage, the latter being keyed to said first gear.

16. A device as in claim 9, said means to prevent rotation of said wheel comprising co-acting friction plates carried, respectively, by said housing and said wheel, means carried by the last-mentioned connecting means and adapted to contact said friction plates, and spring means urging said further element in a direction to cause the contacting means to press said plates together.

17. A device as in claim 16, said plates lying on the axially opposite side of said wheel from said further element.

SHERMAN S. CROSS.
ARLIE A. CROSS.

REFERENCES CITED

The following references are of record in the file of this patent:

UNITED STATES PATENTS

| Number | Name | Date |
|---|---|---|
| 1,797,826 | Gage | Mar. 24, 1931 |
| 1,849,177 | Dickson | Mar. 15, 1932 |
| 1,902,050 | Vincent | Mar. 21, 1933 |
| 1,927,509 | Waterhouse | Sept. 19, 1933 |
| 2,022,689 | Rainsford | Dec. 3, 1935 |
| 2,174,835 | Rainsford | Oct. 3, 1939 |
| 2,500,763 | Lowndes | Mar. 14, 1950 |